Patented Nov. 25, 1930

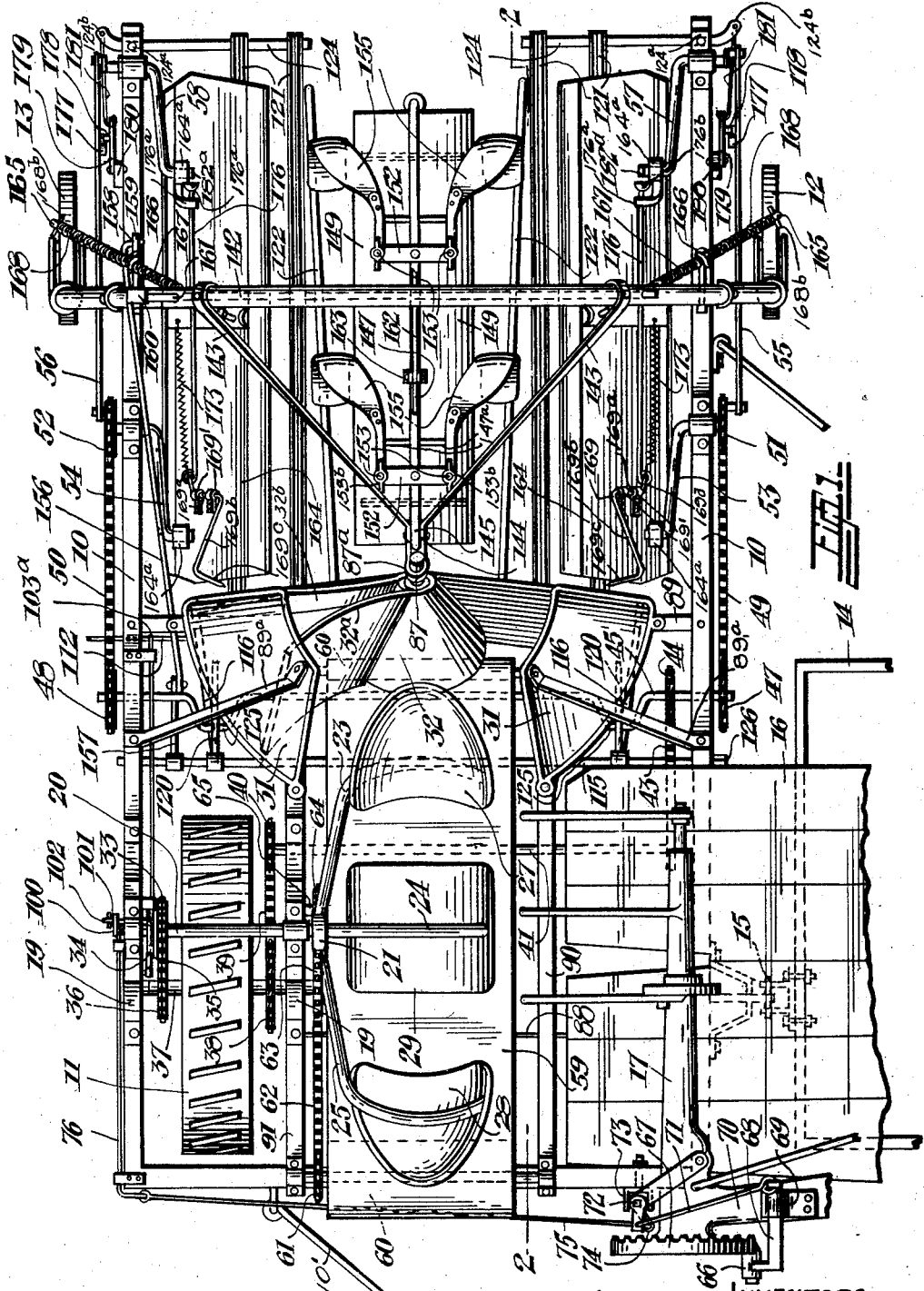

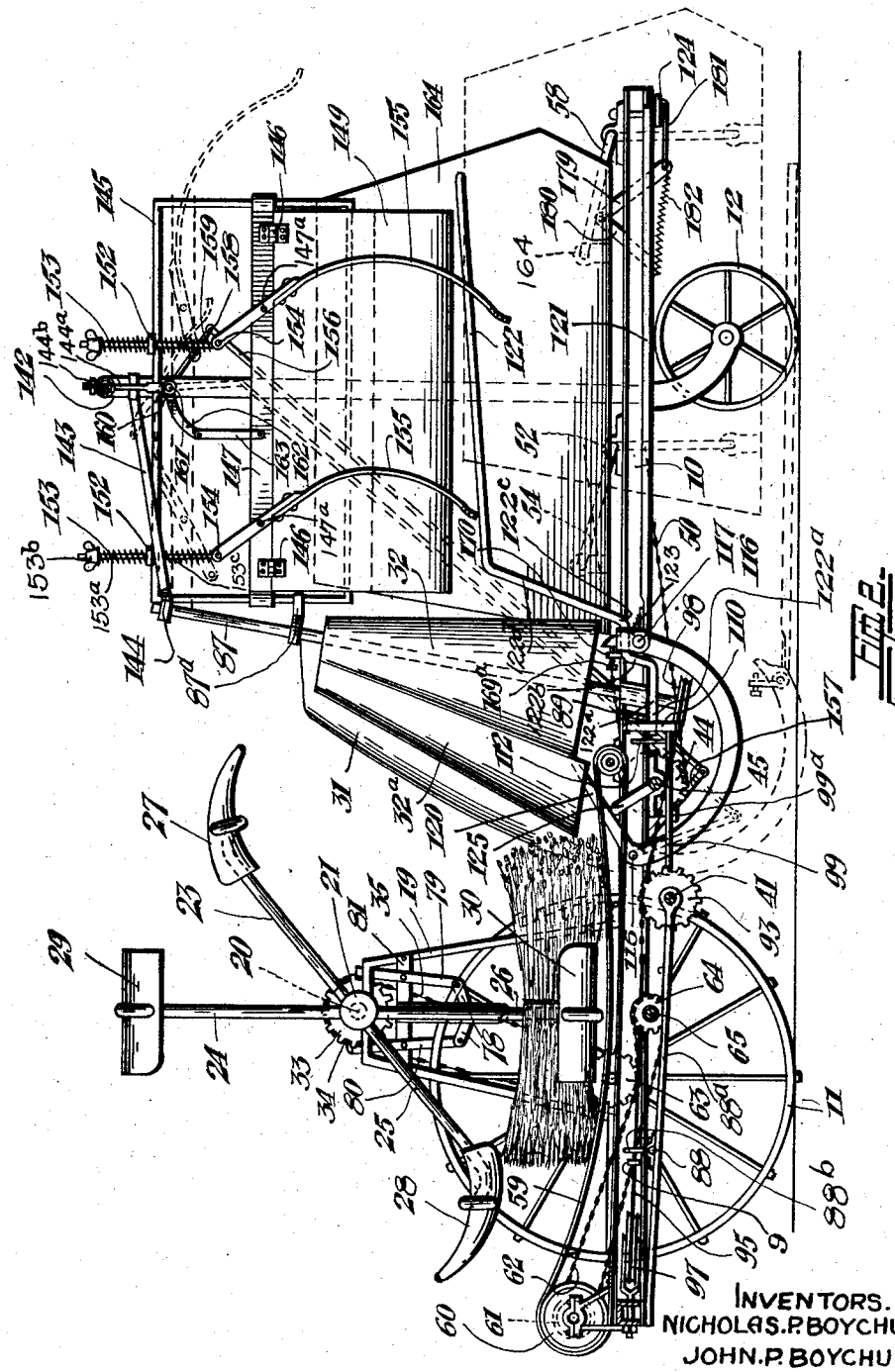

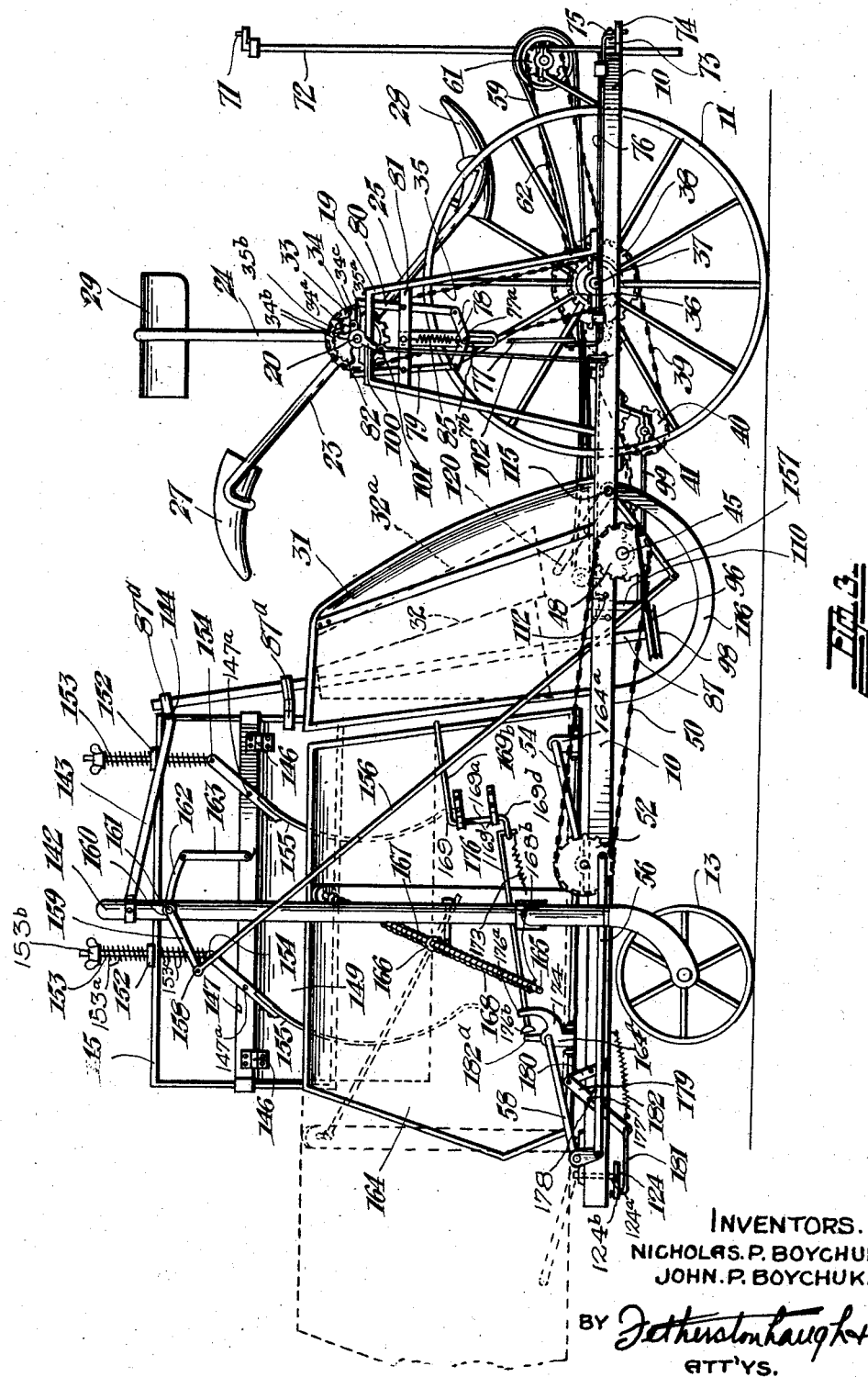

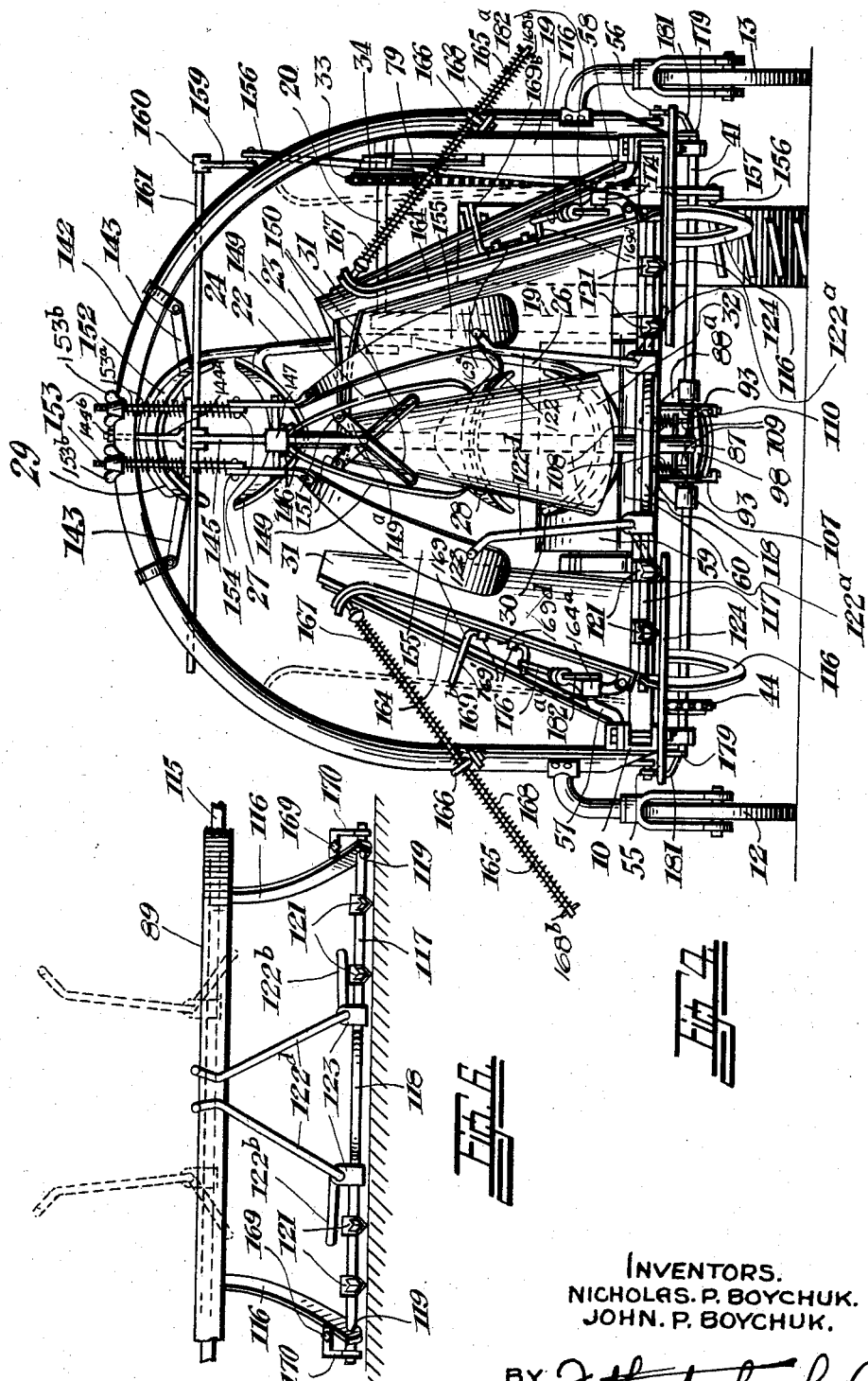

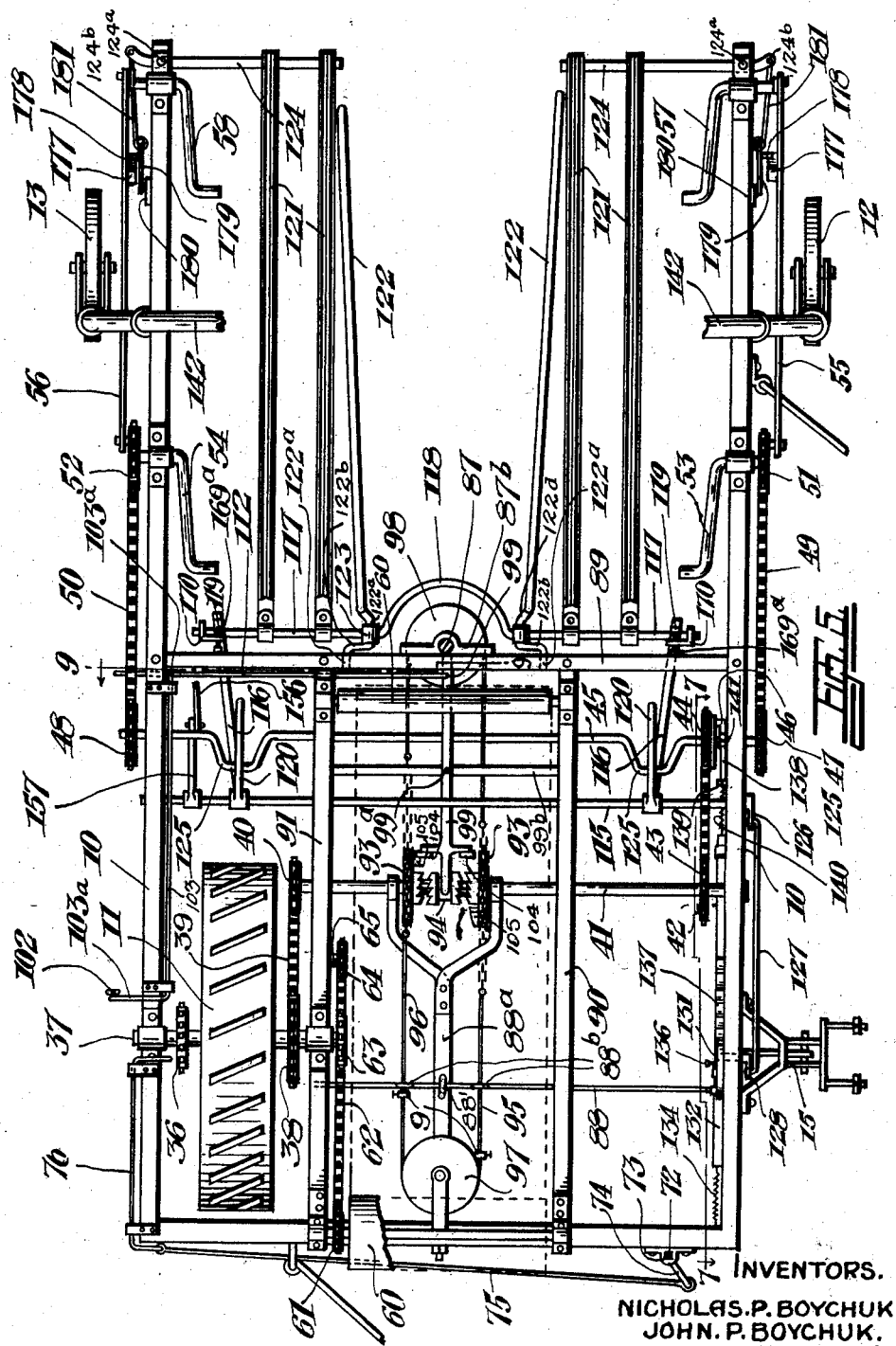

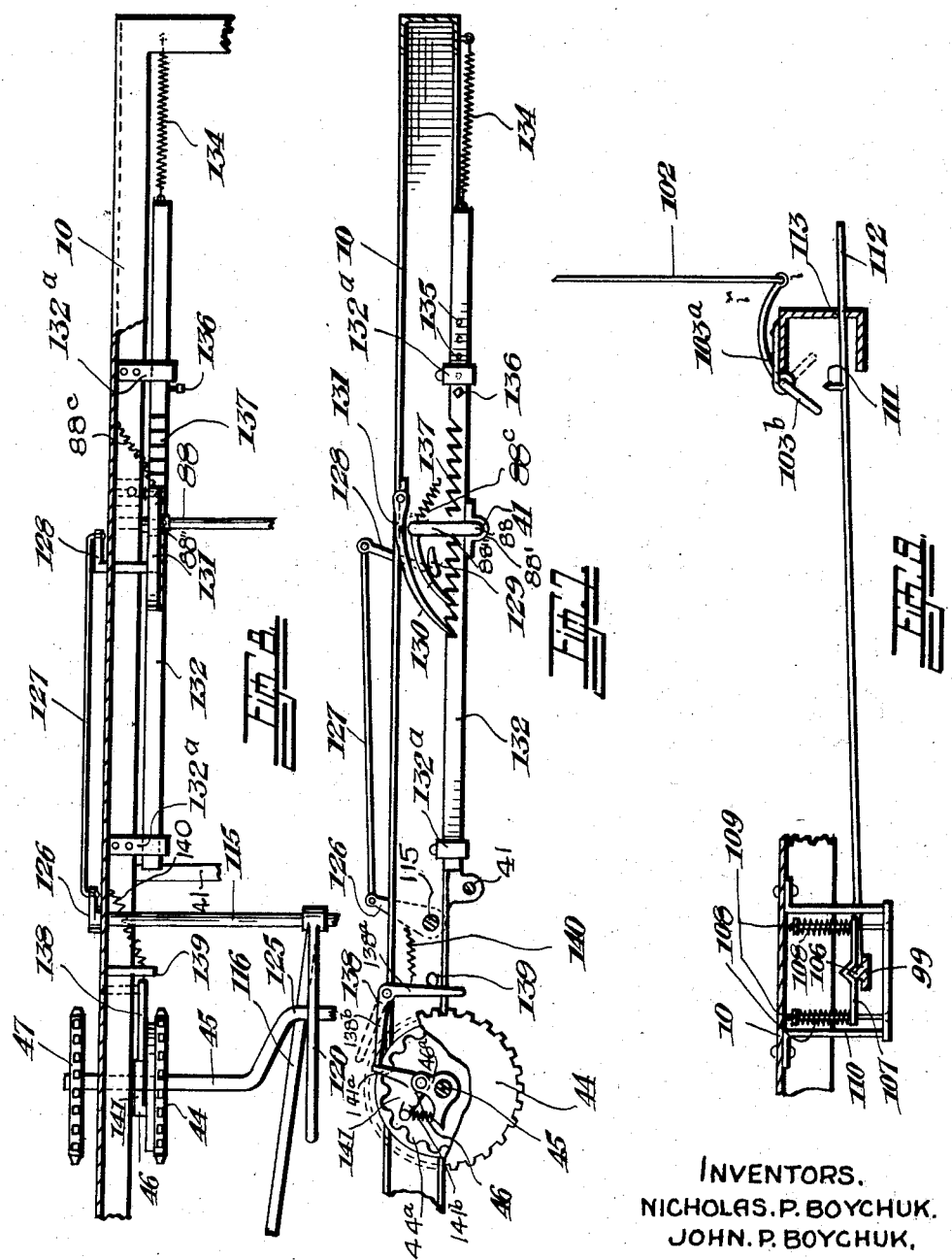

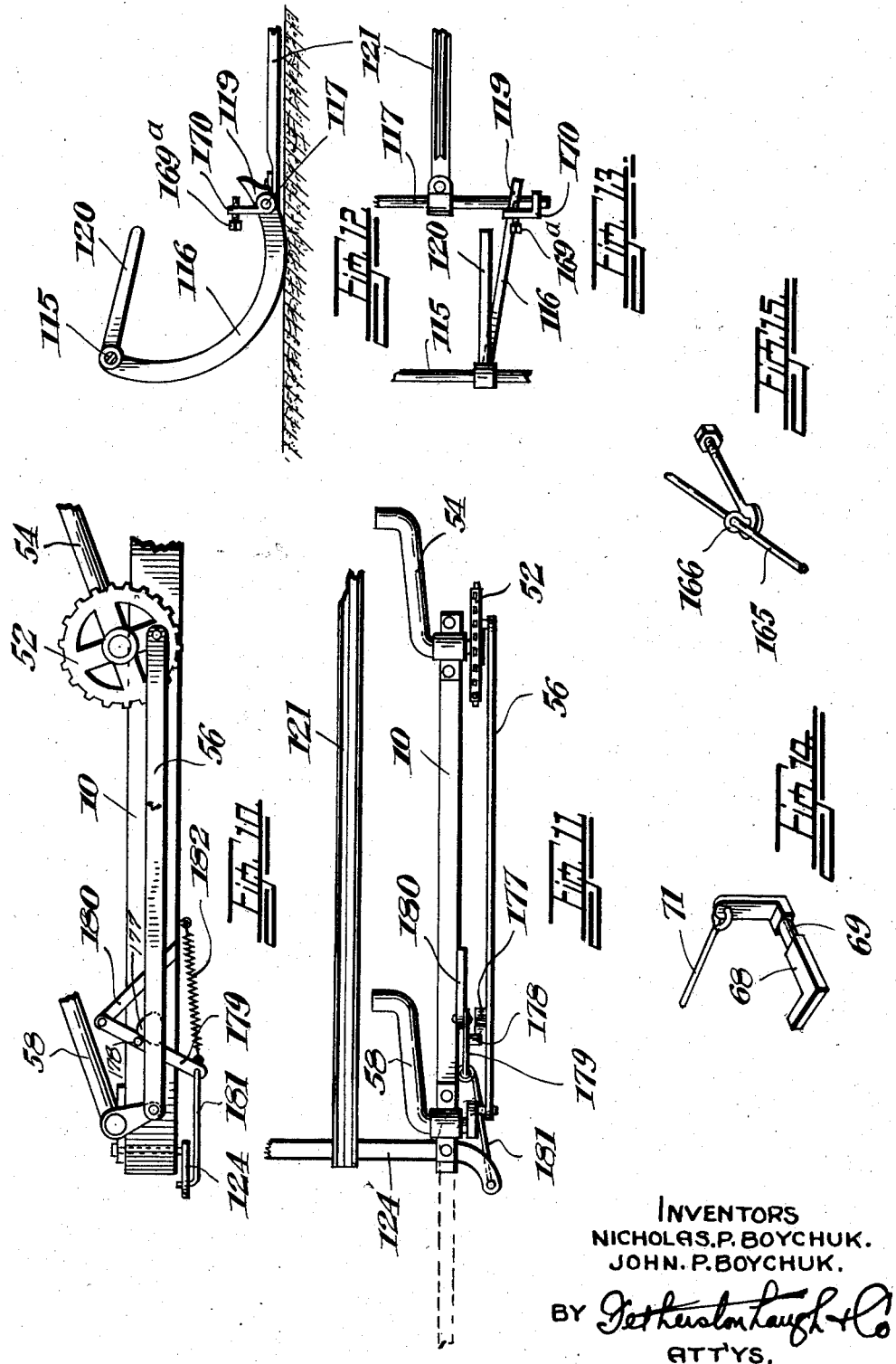

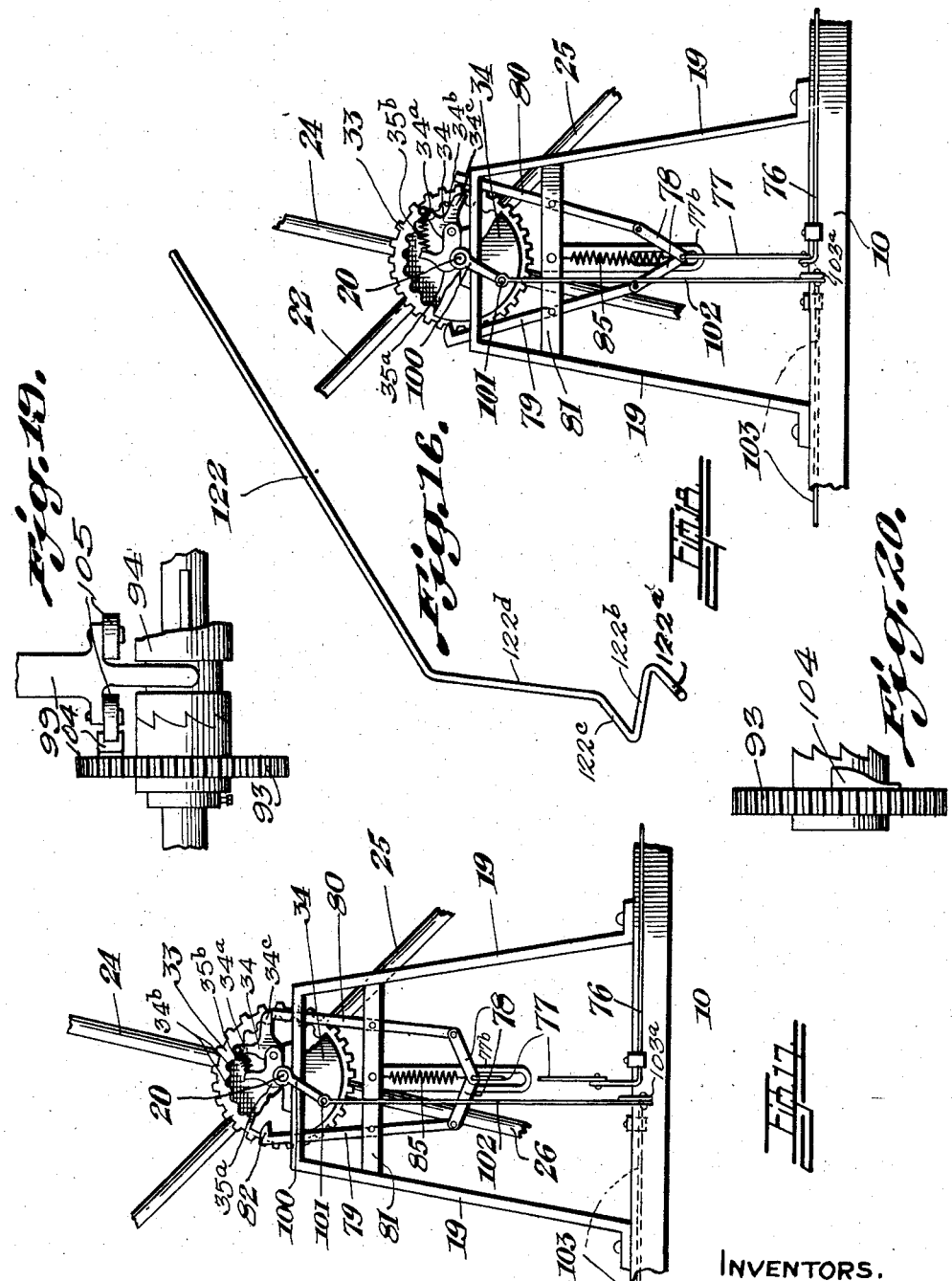

1,782,837

UNITED STATES PATENT OFFICE

NICHOLAS PAUL BOYCHUK AND JOHN PAUL BOYCHUK, OF EDMONTON, ALBERTA, CANADA

SHEAF-SHOCKING MACHINE

Application filed April 5, 1926. Serial No. 99,915.

This invention relates to improvements in sheaf shocking machines as disclosed in our previously filed United States patent application No. 47,150, filed July 30th, 1925, and more particularly to sheaf shocking machines adapted to be attached to a binder for shocking grain or any crop which may be cut and bound by the binder.

One object of the invention is to provide a sheaf shocking machine of light, durable construction, with few parts, that can be manufactured and placed on the market at a comparatively low price.

Another object is to provide an effective device of this character that will receive the sheaves from the binder, form them into properly compressed and shaped shocks and deposit them in upright position on the ground.

A further object of the invention is to effect the compression of the upper part of the shock and spreading of the lower part before being discharged, in order that the shock may be securely deposited.

A still further object is to provide a machine of this description from which the basket in its varying forms, with tracks or other means for raising and lowering it and inverting it, is entirely eliminated.

Subordinate to the foregoing, other objects are to provide a sheaf shocking machine adjustable to the accommodation of varying heights and conditions of grain, to prevent undue shelling of grain in the process of forming the shocks, to regulate the size and location of the shocks and to save hand labour in the harvest field, the construction being so simplified and improved that the various parts are readily accessible for inspection or repair.

Generally speaking, the shocking machine of the present invention is of the binder attachment type including a bull wheel and means for utilizing the bull wheel to furnish the power necessary for actuating the sheaf handling and shock forming and depositing mechanisms in properly timed relation. This utilization of the bull wheel as the source of power for the shocking operation is an important improvement over shocking machines of the type in which the sheaf handling and shock forming mechanisms are driven partly or wholly from the mechanism of the binder as it avoids overloading of the latter. Briefly stated, the present invention comprises a special form of conveyor functioning to receive the sheaves from the binder and to deliver the sheaves to a sheaf placer which is designed and operated to position successively received sheaves at opposite sides of a partition forming part of the shock forming and depositing mechanism. A counter, operating in unison with the sheaf placer, serves to trip the shock forming and depositing mechanism when the desired number of sheaves have been formed into a shock. The conveyor mechanism, sheaf placer, counter and shock forming and depositing mechanism are operated periodically and in proper sequence through the instrumentality of suitable automatically engaging and disengaging clutches forming part of the various drive connections to the bull wheel.

Referring to the drawings, in which like characters of reference indicate corresponding parts in each figure, Figure 1 is a top plan view of our improved sheaf shocker, Figure 2 is a section on the line 2—2 of Figure 1, Figure 3 is a side elevation taken from the reverse side of Figure 2, Figure 4 is a rear end view of the sheaf shocker, Figure 5 is a top plan view of the frame and driving mechanism, Figure 6 is a detail of the sheaf lowering means, the shock spreaders being shown in dotted lines in raised position, Figure 7 is an enlarged sectional view on the line 7—7 of Figure 5, looking in the direction of the arrows, Figure 8 is a top plan of Figure 7, Figure 9 is an enlarged section on the line 9—9 of Figure 5, Figure 10 is a fragmentary detail elevation of the mechanism for operating the guide walls, Figure 11 is a top plan of Figure 10, Figure 12 is an enlarged detail elevation of one of the curved braces supporting the finger bars or skids, Figure 13 is a top plan of Figure 12, Figure 14 is a perspective view of the L-shaped arm, Figure 15 is a perspective view of one of the supporting brackets for the sliding rods, Figure 16 is a perspective view of one of the spreading rods, Figure 17 is an enlarged side elevation of the forward clutch and mechanism for operating certain elements of the conveyor mechanism, Figure 18 is an enlarged side elevation of the forward clutch and mechanism for operating certain elements of the conveyor mechanism, showing the clutch dogs free of the trip levers cooperating therewith.

Figures 19 and 20 are enlarged detailed views of the clutch mechanism controlling operation of the sheaf placer.

Referring more particularly to the drawings, 10 designates the frame of the shocking machine supported by the bull wheel 11 and caster wheels 12 and 13 and is designed to be attached to the binder frame 14 in any well known manner, such as by a universal hitch 15 and suitable braces. At the front end frame 10 is provided with a draw bar 10' adapted to be attached to the same draft means by which the binder is drawn along the ground, the hitch 15 serving to couple the shocking machine to the binder in position to receive the sheaves from the binder deck.

16 designates the binder deck provided with the knotter 17 of well known construction, which is connected, as hereinafter described, with the mechanism for operating the elements of the conveyor mechanism hereinafter described.

Mounted on frame 10, at opposite sides of the bull wheel 11, are a pair of vertical standards 19 equipped with suitable bearings rotatably supporting a transversely extending shaft 20. A hub 21 fixed to this shaft is provided with a plurality of radial arms 23, 24, 25 and 26. The outer ends of the arms 23 and 25 carry rigidly secured sheaf pushers 27 and 28 arranged in fixed trailing relation to transversely curved sheaf lifting and supporting pans 29 and 30 carried by the outer ends of the arms 24 and 26. Positioned directly below the pushers 27, 28 and the pans 29 and 30 is an endless belt 59 mounted on rollers 60 journalled in suitable bearings carried by longitudinal frame members 90 and 91 and driven through the medium of a sprocket 61 and an endless chain 62 from a sprocket 63 of the shaft 37 of the bull wheel, said chain 62 being supported at one end by an idler sprocket 64 mounted on a stub shaft 65 secured to the frame member 91. This belt serves to support the butts of the sheaves delivered to the lifting and supporting pans 29 and 30 as hereinafter set forth.

Shaft 20 is provided with a sprocket 33 rotatably mounted thereon (see Figures 2, 3 and 18) in proximity to a clutch dog 34 pivoted to a member $35^a$ fixed to the shaft 20 to rotate therewith. A spring $35^b$ interposed between the member $35^a$ and the arm $34^a$ of the dog serves to normally urge said arm into driving engagement with one of a plurality of notches $34^b$ formed in the sprocket 33. The remaining arm $34^c$ of the dog is adapted for engagement with a suitable dog tripping mechanism hereinafter referred to through the medium of which the dog is tripped out of driving engagement with the sprocket 33. The sprocket 33 is driven by chain 35 from a sprocket 36 keyed on the bull wheel shaft 37.

At the inner side of the bull wheel 11 and on the bull wheel shaft 37 is keyed a sprocket 38 connected by an endless chain 39 with a fixed sprocket 40 on the transversely extending drive shaft 41, on the opposite end of which is keyed a sprocket 42 connected by an endless chain 43 with a free turning sprocket 44 mounted on a crank shaft 45 extending transversely of the frame 10 and parallel with the drive shaft 41, the latter being journalled in the arms of a forked supporting member $88^a$ suitably secured to the frame 10. The sprocket 44 as shown to advantage in Figures 7 and 8, forms part of a clutch including a dog 46 pivoted to a member $46^a$ keyed on the crank shaft 45 and turning therewith. The dog 46 is normally held out of driving relation with the sprocket 44 by means of a suitable trip mechanism hereinafter set forth.

The crank shaft 45 is designed to protrude at each end beyond the frame 10 and has keyed on these ends sprockets 47 and 48, respectively, connected by endless chains 49 and 50 with sprockets 51 and 52 rigidly attached to the forward cranks 53 and 54. Secured to the sprockets 51 and 52 are pitmen 55 and 56 connected with the cranks 57 and 58, (see Figure 5).

The trip mechanism controlling driving engagement of the dog 34 with the sprocket 33 comprises an arm 66, (see Figure 1), fixed to the side of the wheel 67 of the knotter 17, which arm 66 projects beyond the circumference of the wheel and strikes a projecting L-shaped arm 68 (see Figs. 1 and 14) turnably mounted in a suitable bearing, as at 69, on the knotter standard 70. The inner end of the arm 68 is suitably connected to a rod 71. The other end of the rod 71 is connected to a vertical rod 72 mounted in a suitable bearing 73 on the frame 10 and is formed with a right-angled projection 74 adapted to engage with a transversely extending rod 75 extending across the end of the frame, in turn connected through a suitably bent link rod 76. Connected to the end of this link rod 76 is one extremity of a vertical rod 77, (see Figures 3, 17 and 18), having the other extremity 77ª thereof bent to operate in a slotted guide 77ᵇ and pivotally connected by links 78 to the lower ends of a pair of vertically extending trip levers 79 and 80 pivotally mounted on the cross piece 81 of the upright 19. The trip levers 79 and 80 are arranged at opposite sides of the shaft 20 with the upper ends of said levers disposed to engage at times with the arm 34ᶜ of the dog 34 in order to trip the arm 34ª of the dog out of driving engagement with the notched portion of the sprocket 33. Normally the arm 34ᶜ of the dog engages the free end of the trip lever 80 as shown to advantage in Figure 17 whereby the arm 34ª of the dog is held out of driving engagement with the sprocket 33 against the resistance of spring 35ᵇ. With the parts positioned as shown in this figure it will be apparent that a downward pull on the rod 77 will, through the link connections 78, serve to draw the lower ends of the trip levers 79 and 80 together thereby disengaging the upper end of the lever 80 with the arm 34ᶜ of the dog and permitting the dog to be urged into driving contact with sprocket 33 by means of the spring 35ᵇ. As hereinafter made clear, by the time the dog 34 has traveled in a clockwise direction from the position in which it is shown around to the upper end of the trip lever 79, the trip levers will have been returned to normal position by a spring 85 connected between the cross piece 81 and the end 77ª of the rod 77 so that the arm 34ᶜ of the ascending dog will be engaged by a projection 82 at the upper end of arm 79 and thereby moved against the resistance of the spring 35ᵇ to disrupt the driving engagement between the shaft 20 and the sprocket 33 until the rod 77 is again moved downwardly.

In setting forth the complete operation of the conveyor mechanism described in the foregoing we will assume the parts to be in the position shown in Figure 2 with the pan 30 suspended below the shaft 20 in position to receive a sheaf discharged from the binder deck 16 and with the dog 34 held in nondriving relation to the sprocket 33 by engagement with the trip lever 80. As the sheaf falls into the pan 30 the arm 36 of the knotter 17 operates the L-shaped arm 68 and parts connected therewith to separate the upper ends of the trip levers thereby releasing the dog 34 to permit said dog to be shifted into driving relation with the sprocket 33 under the influence of spring 35ᵇ. The drive connection thus established between the shafts 20 and 37 is maintained until the dog 34 has traveled around to the upper end of the trip lever 79 at which time the dog is engaged and shifted out of driving relation to the sprocket 33 by means of the shoulder 82, it being understood that the trip levers 79 and 80 are spread apart only momentarily to release the dog 34 and immediately return to normal position to intercept the dog after it has traveled a predetermined distance. The shaft 20, during the period that the dog 34 is disposed in driving relation to the sprocket 33, is rotated in an anti-clockwise direction as viewed in Figure 2 to reverse the position of the pans 29 and 30 shown in this figure. The pan 30 carrying the sheaf travels upwardly in the lower arc of a circle during the early part of its travel, whereby the sheaf is gradually upended and carried rearwardly and delivered to the sheaf placer hereinafter described. As the sheaf is upended and carried toward the sheaf placer by the pan 30 the butt of the sheaf is supported upon the upper rearwardly traveling flight of the conveyor belt 59 whereby the sheaf is prevented from slipping off the pan 30 as the angular position of the latter changes during its travel toward the sheaf placer. As the sheaf is upended at the sheaf placer the pan 30 continues to travel upwardly out of engagement with the sheaf while the pusher 28 functions to press the sheaf firmly against the sheaf placer. The transverse curvature of the pan 30 insures that the sheaf will be maintained in the form in which it is delivered to the pan from the binder while the movement of the pan in the lower arc of a circle from sheaf receiving to sheaf discharging position insures that the sheaf will be gradually upended and delivered to the sheaf placer without subjecting the sheaf to any appreciable impact, with the result that undue shelling of the grain is avoided.

The sheaf placer, previously referred to, comprises stationary guide walls 31 and a rotatable cone 32 provided with sheaf pushing wings 32ª and 32ᵇ. The cone 32 is fixed to a vertically inclined shaft 87 rotatably mounted in suitable bearings 87ª and 87ᵇ and adapted, by means hereinafter set forth, to be alternately turned through a partial revolution in each direction. This sheaf placer functions to position the sheaves delivered thereto at opposite sides of a partition forming part of the shock forming and depositing mechanism later referred to. Assuming the sheaf placer to be in the position shown in Figure 1 it will be understood that coincident with the delivery of a sheaf by the conveyer mechanism the shaft 87 will be operated in an anti-clockwise direction whereby the wing 32ª engages the sheaf lying against the cone 32 and serves to push said sheaf rearwardly to position the same at one side of the partition. As the sheaf is thus positioned the drive connection for operating shaft 87 is disrupted thus causing the cone 32 to come to rest with the wing 32ᵇ arranged to engage and position the next sheaf at the opposite side of the partition when the sheaf placer is subsequently operated in a reverse direction. The lower bearing 87ᵇ, of shaft 87 and the guide walls 31 are carried by a cross bar 89 of the frame 10, suitable braces 89ª being connected between the guide walls 31 and the side members of the frame.

The sheaf placer is operated in properly timed relation to the operation of the conveyor mechanism through the instrumentality of the following mechanism. Loosely mounted on the drive shaft 41 and spaced thereon are clutch engaging sprockets 93, between which is a clutch 94, keyed to and slidably mounted on the shaft 41. These sprockets are cable-connected by cables 95 and 96 to a pulley 97 attached in any suitable manner to the frame 10 and also to a pulley 98 on the rotatable placer-carrying shaft 87 whereby, on the shaft 41 being rotated and the clutch 94 operated to engage with one of the sprockets 93, the shaft 87 and placer thereon are rotated in one direction and on the clutch 94 being further operated to throw into gear the other sprocket, the shaft 87 is rotated in the opposite direction. This is automatically performed through a clutch-operating lever arm 99, (see Figures 5 and 9), adapted at its forward end to engage with the clutch 94 to slidably operate it. This lever arm is intermediately pivoted as at 99ª, on a suitable cross bar 99ᵇ, while the end is formed with a ridge 106 of substantially inverted V-shape, designed to engage with the plate 107 spring-actuated by coil springs 108 on the supporting standard 109 and formed with a V-shaped groove registering with said ridge, whereby the arm 99 is normally held, as illustrated in Figure 5, in inoperative position with the clutch member 94 neutral or out of gear.

The plate 107 is mounted in a suitable bracket 110 rigidly secured on the under side of the cross bar 89 of the frame.

Each time a sheaf is placed against the cone 22 of the sheaf placer by the conveyor mechanism the arm 99 is operated automatically through an arm 100 formed on the shaft 20 and pivotally connected at 101 to a vertical extending rod 102. This rod at its lower end is connected, (see Figure 9), to the curved end 103ª of a rotatably mounted rod 103, the opposite end of which is suitably bent to provide a finger 103ᵇ arranged to alternately engage with opposite sides of a lug or projection 111 on a rod 112 slidably mounted in the frame and extending therebeyond, while the other end of this rod is connected to the lever arm 99, so that when the rod 112 is moved inwardly through contact of the finger 103ᵇ with the projection 111, the front end of the lever arm 99 will cause the clutch 94 to be thrown into engagement with one of the sprockets 93, causing the shaft 41 to rotate, and with it the shaft 87, in one direction. Then on the rod 112 being moved outwardly it will cause the arm 99 to slide the clutch 94 into engagement with the other clutch-carrying sprocket to rotate the shaft 87 in the opposite direction.

The drive engagement established between the clutch 94 and either of the clutch sprockets 93 is automatically disrupted after the shaft 87 has completed a partial revolution through the instrumentality of rollers 104 carried by and at each side of the lever arm 99 and adapted to engage with inclines 105 carried by the sprockets 93.

In order that the operation of the clutch mechanism described in the foregoing may be more clearly understood we will assume the parts to be arranged as shown in Figure 9 wherein the lever arm 99 is disclosed as positioned in neutral position with the lug 111 of the rod 112 disposed at the right of the finger 103ᵇ. As the conveyor mechanism previously described is operated through engagement of the dog 34 with the sprocket 33 the rod 102 will be pulled upwardly by the arm 100 on the shaft 20 and at approximately the instant the sheaf is delivered by the conveyor mechanism to the sheaf placer the rod 103 will have been rotated a sufficient distance to shift the finger 103ᵇ from the full line position in Figure 9 to the position indicated by dotted lines. During this movement finger 103ᵇ passes into engagement with the lug 111 and thereby shifts rod 112 and the attached end of the lever arm 99 to the right thus engaging the clutch 94 with one of the sprockets 93. After the sheaf placer has been rotated a sufficient distance in one direction to properly position the sheaf with respect to the shock forming and setting mechanism one of the rollers 104 is engaged by the incline 105 on the sprocket meshing with the clutch 94 whereby the latter together with the arm 99, rod 112 and lug 111 is returned to the neutral position shown in Figure 9, thus placing the lug 111 at the left of the finger 103ᵇ which is now in the position indicated by dotted lines. On the next operation of the conveyor mechanism to deliver a sheaf to the sheaf placer it will be understood that the rod 102 will be moved downwardly thus shifting the finger 103ᵇ from the dotted line to the full line position shown in Figure 9 and through engagement of said finger with the lug 111 causing the rod 112 and the attached end of the arm 99 to be shifted to the left thereby engaging the clutch 94 with the other sprocket 93 and causing the sheaf placer to be rotated in the reverse direction until the clutch 94 is again returned to neutral position by engagement of the incline 105 on the driven sprocket 93 with the cooperating roller 104 of the clutch arm 99.

The shock forming and setting mechanism to which the sheaves are delivered by the sheaf placer includes a transversely extending shaft 115 rotatably journalled in the side members of the frame 10 and equipped with a pair of rigidly attached brackets 116 curving downwardly and rearwardly therefrom. Fixed to shaft 115 immediately above the brackets 116 are a pair of rearwardly extending arms 120 which, during formation of the shock, are supported in the elevated position shown in Figures 2 and 3 by engagement with the underlying cranks 125 of the previously mentioned crankshaft 45. Adjacent their free ends, the brackets 116 are provided with aligned bearing openings in which are journalled the ends of a shaft 117 formed with a central off-set 118 to clear the adjacent pulley 98 of the sheaf placer shaft 87. Shaft 117 is equipped with a plurality of shock carriers consisting of V-shaped rods 121 having their forward ends rigidly secured to the shaft and their rear ends normally supported on suitable supporting bars 124 pivoted to and extending inwardly from the side members of the frame 10 at the rear end of the latter. Shaft 117 also carries a collapsible and expansible shock spreader consisting of a pair of rods 122 which, as shown to advantage in Figure 16, are provided at their forward ends with outwardly offset forwardly extending crank arms 122$^a$. Each crank arm 122$^a$ is connected to the main portion of the rod 122 by the lateral bend 122$^b$, the longitudinal bend 122$^c$ and the upwardly extending portion 122$^d$ and, as shown to advantage in Figure 5, the bends 122$^c$ of the rods are turnably mounted in suitable bearings 123 carried by the shaft 117 at opposite sides of the offset 118. The normal tendency of the rods 122 is to swing inwardly toward one another but, in the arrangement of parts shown in Figure 5, it will be noted that this inward movement of the rods is prevented by engagement of the crank arms 122$^a$ with the underside of the transverse member 29 of the frame 10. Turning movement of the shaft 117 relative to the brackets 116 is limited by a suitable arrangement of stops including set screws 169$^a$ carried by L-shaped plates 70 on the projecting ends of shaft 117 and positioned to engage the extreme ends 119 of the brackets 116.

During the period of forming the shock the shock carrier rods 121 are supported in the horizontal sheaf receiving position shown in Figure 2 with the rear ends of the carrier rods resting on the supports 124 and the front ends of the rods held up by the brackets 116 which, at this time, are maintained in the elevated position shown by full lines through the supporting engagement obtaining between the arms 120 and the cranks 125. When a predetermined number of sheaves have been delivered to and arranged in shock formation upon the carrier rods 121 the shaft 45 is operated, through the medium of a counter mechanism hereinafter described, to move the cranks 125 downwardly and forwardly out of engagement with the arms 120 and at the same time the supports 124 as subsequently made clear, are swung rearwardly out of supporting engagement with the rear ends of the carrier rods 121 thus permitting said rods and the brackets 116 to move downwardly and forwardly toward the ground in a curved path substantially approximating the lower arc of a circle. At each operation, shaft 45 makes one complete revolution (in an anti-clockwise direction as viewed in Figure 2) so that the cranks 125 in returning upwardly and forwardly to the starting position shown in Figure 2 reengage the arms 120 thereby lifting the brackets 116 and the shock carrier rods 121 from the dotted to the full line position shown in Figure 2, suitable provision being also made for automatically replacing the supports 124 beneath the rear ends of the carrier rods 121 at the proper instant.

The counter mechanism controlling the rotation of shaft 45 is operated in unison with the sheaf placer shaft 87 and includes a transversely extending rod 88 rotatably mounted in suitable bearings 88$'$ and equipped with spaced projections 88$^b$ arranged, as shown to advantage in Figures 2 and 5, to be engaged by stops 9 on the cables 95 and 96 of the sheaf placer drive mechanism. At one end rod 88 is provided with a crank 88$''$ carrying a pivoted dog 130 normally engaging the teeth 137 of a rack bar 132 supported for sliding movement in suitable guides 132$^a$ attached to the frame 10. Each time the placer shaft 87 is operated one of the stops 9 engages the projection 88$^b$ arranged in line therewith whereby the rod 88 is turned in a direction to shift the rack bar 32 rearwardly through the engagement of the dog 130 with one of the teeth 137. It will be understood that a spring 88$^c$ connected between the crank 88$''$ and the frame serves to reset rod 88 after each operation thereof. At each actuation of the rod 88 the rack bar 132 is moved a distance represented by one of the teeth 137 and is held against return movement by a retaining dog 131 pivoted to the frame as shown to advantage in Figure 7. A spring 134 connected between the frame and one end of the rack bar 132 serves to return the rack bar to starting position when the pawls 130 and 131 are disengaged, as hereinafter described, through the instrumentality of an arm 126 fixed to the shaft 115 and connected by a rod 127 to a member 128 pivotally carried by the frame and provided with a bent end 129 disposed beneath the pawl 130 and adapted to lift both the pawl 130 and the pawl 131 out of engagement with the teeth of rack bar 132 when a pull is exerted in one direction on the rod 127. Adjacent the end to which the spring 134 is connected the rack bar 132 is provided with a plurality of openings 135 in which a screw 136 is selectively engaged to provide a stop cooperating with one of the guides 132$^a$. It will be readily apparent that by placing the screw 136 in different selected openings 135 the initial position of the rack bar 132 may be adjusted to thereby vary the distance traveled by the bar prior to effecting operation of the shaft 45. Between the free end of the rack bar and the shaft 45 a bell-crank trip lever 138 is pivoted to the frame 10 as shown to advantage in Figure 7 with the arm 138$^a$ of the lever disposed in the path of bar 132 so as to be engaged and moved by the free end of said bar when the latter has traveled a predetermined distance. A spring 140 connected between the frame 10 and the arm 138$^a$ of the lever 138 normally serves to hold said arm against a stop pin 139 whereby the remaining arm 138$^b$ of the bell crank lever is positioned to engage the arm 141$^a$ of the dog 46 to thereby hold the arm 141 of said dog out of driving engagement with the recessed portion 44$^a$ of the sprocket 44.

Through the medium of the pawl 130 the rack bar 132 is moved step by step with each operation of the sheaf placer until the free end of the rack bar engages and swings the arm 138$^a$ of the trip lever 138 in a direction to disengage the arm 138$^b$ of the trip lever with the arm 141$^a$ of the dog 46 thereby permitting the arm 141 of the dog to be moved into driving engagement with the sprocket 44 by the pressure of the spring 141$^b$. As the dog 46 establishes a drive connection between the sprocket 44 and the shaft 45 the latter is rotated from the drive shaft 41 through the medium of a chain 43 thereby moving the cranks 145 out of supporting engagement with the arms 120 of the shaft 115 to permit the brackets 116 and shock carrier rods 121 to move downwardly and forwardly to the ground as previously described. The rotation of the shaft 115 operates through the arm 126, rod 127 and member 128 to raise both of the pawls 130 and 131 out of engagement with the teeth 137 thereby freeing the rack bar 132 to permit the same to be returned to starting position by the spring 134. As soon as the rack bar 132 moves out of tripping engagement with the arm 138$^a$ of the trip lever 138 the spring 140 returns the trip lever to normal position so that as the shaft 45 completes its full revolution the arm 141$^a$ of the dog 46 is again engaged by the arm 138$^b$ of the trip lever whereby the dog is tripped out of driving engagement with the sprocket 44 to disrupt the drive connection between the shafts 41 and 45. By placing the stop screw 136 of the rack bar 132 in different selected openings 135 it will be apparent that the clearance initially reserved between the arm 138$^a$ of the trip lever and the free end of the rack bar may be varied so as to regulate the number of sheaves that will be delivered on to the shock carriers 121 before the latter are operated to a shock depositing position by the establishment of a drive connection between the sprocket 44 and the shaft 45. This enables the size of the shock to be predetermined by the initial setting of the counter mechanism.

Positioned rearwardly of the sheaf placer shaft 87 is a transversely arranged arch-shaped supporting member 142 having its extremities suitably secured to the sides of frame 10. Projecting forwardly from the upper portion of member 142 is a substantially V-shaped bracket 143 carrying at its forward end the upper bearing 87$^a$ of the shaft 87. A further bearing 87$^a$ for the shaft 87 is carried by the front member of a vertically disposed rectangular frame 145 positioned to extend longitudinally of frame 10 between the side portions of member 142. The front member of frame 145 is fastened to the bracket 143 as indicated at 144 while the top member of said frame is supported by a threaded bolt 144$^a$ having its lower end fixed to said top member and its upper end passing through member 142 and equipped with a supporting nut 144$^b$. This frame 145 constitutes a support for a partition, hereinbefore referred to, consisting of a pair of side plates 149 having their upper edges hinged, as at 146, to a bar 147, slidably secured at its terminals to the vertically extending end members of said frame. A pair of cross bars 149$^a$ are pivotally secured at 151 to the inner sides of plates 149 and are formed with longitudinal slots 150 through which the lower member of frame 145 extends. These cross bars 149$^a$, through their engagement with the aforesaid lower member of frame 145, function to collapse and expand the partition by swinging the plates 149 inwardly and outwardly as the said plates together with the bar 147 are moved upwardly and downwardly on the frame 145 as hereinafter explained.

Mounted on the top of frame 145 are a plurality of cross plates 152. Each plate 152 is provided at its extremities with suitable vertical openings loosely receiving therethrough a pair of vertically extending bolts 153 having their lower ends pivotally secured, as at 154, to the upper extremities of control arms 155 arranged at opposite sides of the partition afforded by the plates 149. The control arms 155 are arranged in pairs with the arms of each pair pivoted to opposite sides of the vertically movable bar 147 as indicated at 147$^a$. The upper portion of each bolt 153 is encircled by a coil spring 153$^a$ confined between the cross plate 152 and a nut 153$^b$ while the lower portion of the bolt is encircled by a similar spring 153$^c$ confined between the plate 152 and the connected end of the control arm 155. From the foregoing it will be manifest that as the arms 155 are moved upwardly with the bar 147 and plates 149 the pressure of the springs 153 on the upper ends of said arms will tend to swing the latter to the dotted line position shown in Figure 2. When the bar 147 and plates 149 are lowered the arms 155 will be returned to the full line position shown in Figure 2 by the action or pressure of the springs 153ª. These control arms 155 are shaped to conform somewhat to the contour presented by the partition when the latter is expanded and serve to engage and position the sheaves as the latter are delivered by the sheaf placer to opposite sides of the partition.

In order to control raising and lowering of the bar 147 on the frame 145 there is provided a rod 156 having its lower end pivotally secured to an arm 157 on the shaft 115 and its upper end pivotally secured to an arm 159 rigidly carried by a rotatable shaft 161 journalled in the upper portion of the member 142. This shaft 161 is provided with a second arm 162 connected by a link 163 to the bar 147. This construction is clearly shown in Figure 3 and it will be understood that as the shaft 115 rotates, as previously described, to move the carrier rods 121 downwardly and forwardly from beneath the shock formed thereon the arm 157 will act through its connections to the bar 147 to raise the latter together with the partition plates 149 and the control arms 155. During the upward movement thereof the plates 149 are drawn together by the cross bars 149ª to collapse the partition so as to permit the same to pass upwardly from between the heads of the two rows of sheaves arranged at opposite sides thereof. At the same time the control arms 155 are swung to the dotted line positions indicated in Figure 2 and out of engagement with the sheaves.

A pair of metal guide walls 164 are arranged at opposite sides of the partition and each wall is hinged at its lower edge to bearing members 164ª carried by the cranks 53, 54, 57 and 58. The upper portions of these walls are normally inclined inwardly toward the partition by the pressure of spring devices consisting of rods 165 passing slidably through eyelets 166 carried by the member 142 and having their inner ends pivotally secured to the upper portions of the walls. Each rod is encircled by an inner spring 167 and an outer spring 168. The inner spring of each rod is confined between the eye 166 and the outer surface of the wall 164 while the outer spring 168 is confined between the eye 166 and a suitable abutment 168ᵇ. With this arrangement of springs it will be apparent that the pressure exerted by the inner springs 167 against the walls 164 will be increased and decreased when, through the movement of said walls, the distance between the eyes 166 and the ends of the rods attached to the walls is shortened and lengthened. Likewise the opposing pressure exerted by the outer springs 168 against the abutments 168ᵇ will increase and decrease with the shortening and lengthening of the distance between said abutments and the eyes 166.

During the period of forming the shock the walls 164 are supported as shown by full lines in Figures 1 and 3 being yieldingly inclined toward the adjacent sides of the partition by the pressure of the springs 167. The sheaf placer functions to position the sheaves delivered thereby in two rows at opposite sides of the partition and the heads of the sheaves are yieldingly held against the plates 149 of the partition by the pressure of the upper portions of the walls 164 whereby the sheaves are maintained in an inclined position with the butts of the two rows of sheaves lying at opposite sides of and spread apart by the shock spreading rods 122. When the crank shaft 45 is thrown into gear with the drive shaft 41 through the clutch mechanism previously described the cranks 53, 54, 57 and 58 are turned through a complete revolution from the position shown in Figure 2 through the medium of the drive connection afforded by the chain 49 and the pitmen 55 and 56. During the initial movement thereof the cranks carrying the walls 164 move downwardly and rearwardly whereby said walls travel in substantially the lower arc of a circle in moving from the full line to the dotted line position shown in Figure 2. During this movement of the walls the distance between the eyelets 166 and the ends of the rods 165 attached to said walls is decreased with the result that the springs 167 serve to swing the walls inwardly about the hinge connections to the bearings 164ª whereby the upper portions of said walls are pressed inwardly to grasp the upper portion of the shock and to thereby carry the latter downwardly and rearwardly therewith. Simultaneously with this movement of the walls 164 the bar 147 is moved upwardly on the frame 145 by the means previously described so that the plates 149 are caused to fold together and to pass upwardly from between the heads of the two rows of sheaves forming the shock while at the same time the control arms 155 are swung upwardly out of engagement with the sheaves. During the continued rotation of the cranks 53, 54, 57 and 58 subsequent to the setting of the shock upon the ground the distance between the eyes 166 and the ends of the rods 165 attached to the walls 146 increases, while the distance between said eyelets and the abutments 168ᵇ decreases with the result that the pressure of the springs 168 against the abutments 168ᵇ serves to force the rods outwardly thus pulling the upper portions of the walls 164 outwardly from the interposed shock. As the walls 164 return to normal position the rods 165 and associated springs assume the position shown in Figure 3. From the foregoing it will be apparent that as the partition separating the two rows of sheaves constituting the shock is collapsed and raised clear of the shock together with the control arms 155 the walls 164 are pressed inwardly to grip and compress the head of the shock and to cause the shock to travel downwardly and rearwardly with said walls and in a curved path substantially approximating the lower arc of a circle whereby the shock is placed upon the ground by the walls in such manner as to insure a proper setting of the shock without imparting forward momentum thereto. The movement of the formed shock downwardly and rearwardly into engagement with the ground is carried out coincidentally with the movement of the carrier rods 121 downwardly and forwardly to the dotted line position shown in Figure 2 with the result that by the time the shock reaches the ground a considerable portion of the carrier rods 121 is withdrawn from beneath the same.

In order to prevent slippage between the walls 164 and the interposed shock during depositing of the latter the said walls are provided with suitable grab hooks 169. Each hook consists of a substantially vertical shaft portion 169$^a$ mounted in suitable bearings 169' on the outer surface of one of the walls 164. At its upper end the shaft portion 169 is formed with an integral forwardly extending arm 169$^b$ terminating in an inwardly projecting prong 169$^c$. At its lower end the vertical shaft portion 169$^a$ is formed with a crank 169$^d$ to which is secured one end of an operating rod 176 mounted for sliding movement in a bearing arm 176$^a$ carried by one of the rear crank bearings 164$^a$. A spring 173 connected between the wall 164 and the end of the rod 176 attached to the crank 169$^d$ serves to normally hold the prong 169$^c$ in the outwardly swung or inoperative position shown in Figure 1. The ends of the rods 176 mounted in the bearings 176$^a$ are provided with enlarged heads 176$^b$ lying close to but normally out of engagement with suitable cam projections 182$^a$ carried by the rear cranks 57 and 58. As the cranks 57 and 58 rotate in carrying the walls 164 from the sheaf receiving position shown in Figure 1 to the shock depositing position indicated by dotted lines in Figure 2 it will be apparent that the cam projections 182$^a$ will be rotated into pushing engagement with the enlarged heads 176$^b$ of the rods 176 thereby shoving said rods forwardly and causing the prongs 169$^c$ to be swung inwardly into penetrating engagement with the forward sheaves of the shock to hold the shock against forward slippage relative to the walls 164 during the shock depositing movement of said walls. As the shock is set upon the ground the cam projections 182$^a$ pass out of engagement with the enlarged heads 176$^b$ of the rods 176, thus permitting the springs 173 to retract the prongs 169$^c$, and thereby permit the walls 164 to slip past the shock during the continued movement of said walls.

The supports 124 for the rear ends of the carrier rods 121 are intermediately pivoted as at 124$^a$ to the frame 10 with the outer ends of said supports curving outwardly and rearwardly beyond the side members of the frame as indicated at 124$^b$. Each support is secured to the frame by an operating connection in the form of a toggle joint including a bar 179 having its upper end pivotally secured to the corresponding end of a bar 180. The lower end of bar 180 is suitably secured to the frame 10 while the lower end of the bar 179 is connected by link 181 to the outer end 124$^b$ of the adjacent support 124. A spring 182 connected between the lower end of the bar 179 and the frame 10 normally tends to fold the bars 179 and 180 together to exert an inward pull at the outer end 124$^b$ of the bar 124 so as to swing the inner portion of said bar rearwardly and out of engagement with the carrier rods 121. Rounded shoulders 177 carried at the inner sides of the pitmen 55 and 56 are normally engaged with pins 178 secured to the bars 179 of the toggle joints whereby the bars 179 and 180 of each joint are maintained in the position shown in Figure 3 against the resistance of spring 182. In the arrangement of parts shown in this figure it will be noted that the shoulders 177 are positioned forwardly of the pins 178 and in engagement therewith whereby the bars 179 are prevented from being drawn forwardly by the springs 182. During the initial movement of the walls 164 to shock depositing position it will be appreciated that the pitmen 55 and 56 move rearwardly causing the shoulders 177 to force the pins 178 upwardly and rearwardly until the crests of the shoulders pass beneath the pins at which time the springs 182 will function to swing the lower ends of the bars 179 forwardly thereby swinging the inner portions of the supports 124 rearwardly and out of supporting engagement with the carrier rods 121. As the pitmen 55 and 56 return to normal position the shoulders 177 are reengaged with the pins 178 to return the bars 179 and the supports 124 to normal position at about the instant the carrier rods 121 are returned to sheaf receiving position through mechanism previously described in connection therewith.

In reviewing the complete functioning of the machine we will assume the sheaf receiving pan 30 to be positioned in sheaf receiving position substantially as shown in Figure 2. As a sheaf is delivered to this pan from the binder the sprocket 33 is clutched to the shaft 20 as previously set forth so as to establish a drive connection between this shaft and the bull wheel shaft 37. Through this drive connection shaft 20 is revolved in an anti-clockwise direction as viewed in Figure 2 until the drive connection is disrupted subsequent to the delivery of the sheaf to the sheaf placer. During this operation of shaft 20 the sheaf is carried upwardly and rearwardly by the pan 30 until it assumes an upright position in the vicinity of the cone 32 of the sheaf placer at which time the sheaf is discharged from the pan 30 by reason of the fact that the sheaf after assuming an upright position remains supported on the endless belt 59 while the pan 30 continues to travel upwardly and out of engagement with the sheaf until the pan 29 approaches the sheaf receiving position formerly occupied by the pan 30 at which time the drive connection between the shafts 20 and 37 is disrupted by the tripping of the dog clutching the sprocket 33 to said shaft 20. In moving from the position shown in Figure 2 to an upright position in the vicinity of the cone 32 of the sheaf placer the sheaf travels substantially in the lower arc of a circle so that the upending and delivery of the sheaf to the sheaf placer is accomplished without subjecting the sheaf to any appreciable impact such as would result in disrupting the form of the sheaf or causing undue shelling of the grain. As the sheaf is upended at the sheaf placer the pusher 28 arranged in trailing relation to the pan 30 comes into engagement with the sheaf to steady and position the same while the pan 30 is traveling upwardly out of engagement therewith.

As the pan 30 and pusher 28 passes out of engagement with the upended sheaf the clutch 94 is operated through its connections to the shaft 20 to engage with one of the sprockets 93 and thereby operate the sheaf placer to shove the sheaf onto the carrier rods 121 between one of the guide walls 164 and the adjacent plate 149 of the partition. Coincident with this operation of the sheaf placer the rack bar 132 or the sheaf counter mechanism is advanced one tooth by the operation of the rod 88 and its attached pawl 130. As the sheaf passes between the partition and the guide wall 164 the head of the sheaf is held to the partition by the pressure of the upper portion of the guide wall while the butt of the sheaf is held outwardly from the partition by engagement with the outer side of one of the spreader rods 122. As the sheaf is thus positioned by the sheaf placer the drive connection between the sheaf placer shaft 87 and the drive shaft 41 is disrupted through the shifting of the clutch 94 to neutral position through the instrumentality of the means previously described for this purpose. The sheaf placer is reversely rotated in timed relation to successive operations of the conveyor mechanism and the arrangement of the wings 32ª and 32ᵇ of the cone 32 of the sheaf placer is such that as one wing functions to push a sheaf into position between the partition and one of the walls 164 the other wing is positioned to engage the next sheaf delivered to the sheaf placer by the conveyor mechanism so that on the reverse operation of the sheaf placer the sheaf delivered thereto will be positioned between the partition and the opposite wall 164.

When the desired number of sheaves, predetermined by the initial setting of the rack bar 132 of the counting mechanism has been positioned at opposite sides of the partition afforded by the plates 149 the free end of the bar 132 contacts with and shifts the trip lever 138 out of engagement with the dog 46 thus permitting said dog, under the influence of the spring 141ᵇ, to establish a drive connection between the shaft 45 and the sprocket 44 whereby said shaft 45 is turned through a full revolution through the medium of the chain 43 connecting the sprocket 44 with the sprocket 42 of the drive shaft 41. As the cranks 125 of the shaft 45 rotate out of supporting engagement with the arms 120 of the shaft 115 the latter is free to rotate in its bearings and the brackets 116 drop downwardly and forwardly carrying with them the shaft 117 and the carrier rods 121. The said rods 121 move downwardly and forwardly in substantially the lower arc of a circle so as to be partially withdrawn from beneath the shock as they approach the ground. Coincident with the downward and forward movement of the carrier rods 121 the cranks 53, 54, 57 and 58 are operated by the pitmen 55 and 56 and the chain connection 49 to the crank shaft 45 to move the guide walls 164 from the sheaf receiving position shown by full lines in Figure 2 to the sheaf depositing position indicated by dotted lines in said figure. Simultaneously with this actuation of the guide walls 164 the rod 156 is actuated by the arm 157 of the shaft 115 to collapse the partition afforded by the plates 149 and to raise said partition together with the control arms 155 out of engagement with the two rows of sheaves forming the shock. During the early part of the movement of the guide walls 149 to shock depositing position the upper portions of said walls are swung inwardly by the increasing pressure of the springs 167 so as to grasp the heads of the sheaves therebetween as the partition is displaced to its elevated position. The interposed shock is thus caused to be grasped and supported by the walls 164 and to move downwardly and rearwardly therewith whereby the shock is actually carried to the ground and firmly planted thereon instead of being merely dropped to the ground. During the movement of the walls 164 from the full line to the dotted line position shown in Figure 2 the prongs 169ᶜ of the grab hooks 169 are operated into penetrating engagement with the forward sheaves of the shock as previously described so as to prevent slippage of the shock during the depositing operation. As the shock is placed upon the ground these grab hooks are retracted by the previously mentioned springs associated therewith so as not to interfere with the return of the guide walls 164 to normal position.

The shock spreader rods 122, being carried by the shaft 117, move downwardly and forwardly with the carrier rods 121 and as the cranks 122$^a$ of these spreader rods are disengaged with the cross bar 89 of the frame 10 the body portions of the rods swing inwardly from the dotted line position shown in Figure 6 to the full line position shown in said figure so that the said rods will slip freely from between the two rows of sheaves subsequent to the deposit of the shock.

As the shaft 45 makes a full revolution at each operation it will be appreciated that subsequent to the depositing of the shock the crank arms 125, brackets 116, carrier rods 121, supports 124, spreader rods 122 and the guide walls 164, will be returned to the sheaf receiving position indicated by full lines in Figure 2 prior to disruption of the drive connection between said shaft 45 and the drive shaft 41. It will be also apparent that as the cranks 125 return to supporting engagement with the arms 120 of the shaft 115 the arm 157 on the said shaft 115 will function through its connections to the bar 147 to return the partition and control arms 155 to the position occupied by these parts during the formation of a shock.

During the early part of the rotation of shaft 115, subsequent to the establishment of a drive connection between shafts 41 and 45 the arm 126 of shaft 115 acts through the rod 127 and member 128 to raise both of the pawls 130 and 131 and thereby permit the rod 132 of the counting mechanism to be reset by the spring 134.

The limited pivotal movement which the carrier rods 121 and shaft 117 are permitted to have independently of the brackets 116 is important for the reason that the brackets 116 begin to raise the shaft 117 and the attached ends of the rods 121 before the rear ends of the latter have been drawn clear of the shock. As the brackets 116 begin to raise the shaft 117 it will be apparent that the rods 121 will assume a slightly inclined position due to the fact that the rear ends of the rods remain on the ground during the initial lifting of the forward ends and this inclination of the rods enables the same to be drawn clear of the shock without exerting any forward drag at the base of the shock.

The hinging of the walls 164 to the bearings 164$^a$ and the provision of the spring devices including the rods 165 and associated springs is a very important feature of the invention for the reason that, by reason of this construction, the said walls are spring pressed and laterally movable to accommodate themselves to variations in the height and thickness of the sheaves interposed therebetween and the partition.

From the foregoing it will be apparent that we have devised a very efficient and practical form of shocking machine adapted to be attached to a binder but furnishing its own source of power for operating the various sheaf handling and shock forming mechanisms. This machine is capable of forming shocks of various size by the initial setting of the counter mechanism to permit a greater or lesser number of sheaves to be delivered by the sheaf placer to the shock forming and depositing mechanism before the latter is operated to deposit the sheaves delivered thereto. The shock forming means including the hingedly mounted walls between which the shock is built is capable of lateral expansion and contraction to compensate for variations in the height and thickness of the sheaves delivered thereto thus adapting the machine to work satisfactorily irrespective of variations in the height, thickness and other conditions of the grain. From the time the sheaves are received from the binder until they are placed upon the ground in shock formation the sheaves are handled in such manner as to prevent disrupting the forms of the sheaves or subjecting the same to such impacts as would cause undue shelling of the grain. Each sheaf is received in a horizontal position from the binder and is moved upwardly and rearwardly in the lower arc of a circle so as to deliver the same in upright position at the sheaf placer. The latter revolves about a substantially vertical axis and serves to engage and push the upended sheaf on to the horizontally supported sheaf carrier rods 121. The sheaves are initially inclined by being placed against the cone of the sheaf placer and this inclination of the sheaves is maintained when the latter are interposed between the partition and the guide walls 164 by reason of the fact that the head of each sheaf is pressed against one of the sloping sides of the partition by the upper portion of the adjacent guide wall while the butt of the sheaf is held outwardly by engagement with the outer side of one of the spreader rods 122. As successive sheaves are delivered to each side of the partition each sheaf serves to push the preceding sheaf rearwardly and this rearward movement of the sheaves is controlled by engagement of the sheaves with the control arms 155 which also serve to properly incline and position the sheaves as they engage therewith. After the shock has been formed the sheaves, instead of being permitted to drop directly to the ground are grasped between the guide walls 164 and carried downwardly and rearwardly in a curved path substantially approximating the lower arc of a circle. As the formed shock is thus moved downwardly and rearwardly while the machine is traveling forwardly it will be appreciated that the sheaves are placed upon the ground without imparting forward momentum thereto as the guide walls, after depositing the formed shock continue to travel upwardly and rearwardly in returning to normal shock forming position. It is thus evident that in the formation and depositing of the shock there is no rough handling or jarring of the sheaves at any stage of the operation with the result that a more perfect shock formation is obtained than heretofore.

Having thus described what I now consider to be the preferred embodiment of the principles of this invention it will be understood that various changes in the construction, arrangement and proportion of parts may be resorted to within the scope and spirit of the appended claims.

What we claim as our invention is:

1. The combination with a binder having an arm carried by the binder knotter wheel shaft, of a shocking machine equipped with a conveyor mechanism including a rotatable shaft carrying a plurality of radially disposed pans adapted to receive the sheaves discharged from the binder, a drive shaft, a normally disengaged clutch for establishing a drive connection between the first mentioned shaft and the drive shaft, means controlled by said arm for engaging said clutch concurrently with delivery of a sheaf to one of said pans and means for automatically disengaging said clutch after a predetermined operation of the shaft carrying said pans.

2. In a shocking machine the combination with a binder of an arm carried by the knotter wheel shaft of the binder, a conveyor mechanism including a rotatable shaft carrying sheaf pushers and a plurality of pans adapted to receive the sheaves from the binder, a drive shaft, a normally disengaged clutch for establishing a drive connection between the drive shaft and the first mentioned shaft, means controlled by said arm for engaging said clutch concurrently with delivery of a sheaf to one of said pans and means for automatically disengaging the clutch after a predetermined operation of the pan carrying shaft.

3. A shocking machine comprising a conveyor mechanism including a rotatably mounted shaft carrying a plurality of sheaf receiving pans and a plurality of sheaf pushers arranged in trailing relation to said pans, means operating concurrently with delivery of a sheaf to one of said pans to establish a drive connection for operating said shaft to move the sheaf carrying pan to a sheaf discharging position and to simultaneously shift another one of the pans to a sheaf receiving position, means for automatically disrupting said drive connection after a predetermined operation of the shaft, a movable sheaf placer positioned to receive the sheaves from said pans, means controlled by operation of the pan carrying shaft to establish a drive connection for operating the sheaf placer with each delivery of a sheaf thereto and means for disrupting the last-named drive connection after each operation of the sheaf placer.

4. In a shocking machine the combination with the shock forming means, of a sheaf placer to which the sheaves are delivered prior to the formation of the shock, said sheaf placer comprising a vertically extending rotatable shaft, a cone carried by said shaft and equipped with sheaf pushing wings, a conveyor mechanism functioning to receive sheaves from a binder and to place the sheaves in upright position against said cone, means for automatically operating the conveyor mechanism with each delivery of a sheaf thereto including provision for terminating the operation of the conveyor mechanism with each delivery of a sheaf to the sheaf placer, and means controlled by the operation of the conveyor mechanism for reversibly rotating the shaft of the sheaf placer as successive sheaves are delivered thereto.

5. A shocking machine comprising shock forming and depositing means, a conveyor mechanism functioning to receive the sheaves from a binder and including a rotatable shaft carrying alternately arranged sheaf lifting and pushing means, means for automatically throwing said shaft into gear with a suitable drive mechanism upon delivery of a sheaf to the conveyor mechanism, means for automatically throwing said shaft out of gear with the drive mechanism upon discharge of a sheaf from said conveyor mechanism, a reversibly rotatable sheaf placer arranged to receive the sheaves from the conveyor and to deliver said sheaves to the shock forming and depositing means, means controlled by operation of the conveyor for actuating said sheaf placer with each delivery of a sheaf thereto and means for operating the shock forming and depositing means to deposit the formed shock including a counter mechanism operated by and in unison with the sheaf placer.

6. A shocking machine equipped with a bull wheel and means for carrying the formed shock downwardly and rearwardly relative to the frame of the machine in a curving path approximating the lower arc of a circle so as to place the shock upon the ground without imparting forward momentum thereto, said means being controlled by the bull wheel in such manner that the formed shock is carried downwardly and rearwardly to the ground at a speed corresponding to the forward traveling speed of the machine.

7. A shocking machine equipped with shock gripping means for moving the formed shock relative to the frame of the machine and in a downwardly and rearwardly curved path substantially following the lower arc of a circle whereby the shock is firmly set upon the ground without imparting forward momentum thereto.

8. A shocking machine equipped with shock gripping means for moving the formed shock relatively to the machine and in a downwardly and rearwardly curving path approximating the lower arc of a circle, said means including provision for simultaneously compressing the heads of the sheaves.

9. A shocking machine equipped with shock forming and depositing means including shock carriers on which the sheaves are supported during formation of the shock, means for moving said carriers downwardly and forwardly to the ground so as to substantially withdraw the carriers from beneath the shock and means for gripping and carrying the formed shock downwardly and rearwardly to the ground coincident with the aforesaid withdrawal of the carriers from beneath the shock.

10. A shocking machine equipped with a bull wheel shock forming and depositing means including shock carriers on which the sheaves are arranged in shock formation, means for periodically moving said carrier downwardly and forwardly and means, actuated from the bull wheel, for simultaneously carrying the formed shock downwardly and rearwardly at a rate of speed corresponding to the forward traveling speed of the machine.

11. A shocking machine equipped with shock forming and depositing mechanism including carrier means on which the shock is formed, means for moving the carrier means downwardly and forwardly upon completion of the shock and means for simultaneouly carrying the formed shock in a downwardly and rearwardly curving path substantially approximating the lower arc of a circle.

12. A shocking machine equipped with shock forming and depositing mechanism including shock carriers on which the sheaves are arranged in shock formation, means for moving said carriers in a downwardly and forwardly curving path upon completion of the shock and means for simultaneously carrying the formed shock in a downwardly and rearwardly curving path approximating the lower arc of a circle.

13. A shocking machine equipped with shock forming and depositing mechanism including a support on which the sheaves are arranged in shock formation, guide walls positioned to receive the sheaves therebetween as the latter are placed upon the support, means for moving the support downwardly and forwardly upon completion of the shock and means for simultaneously moving the guide walls to carry the interposed shock to the ground along a downwardly and rearwardly curving path.

14. A shocking machine equipped with shock forming and depositing mechanism including shock carriers upon which the sheaves are arranged in shock formation, means for moving said carriers downwardly and forwardly upon completion of the shock and simultaneously functioning means operating to compress the heads of the sheaves and to simultaneously carry the formed shock to the ground along a downwardly and rearwardly curving path.

15. A shocking machine equipped with shock forming and depositing mechanism including a displaceable support, guide walls between which the shock is formed on said support, means for displacing said support on completion of the shock to permit depositing of the latter and means for operating said walls to grip the formed shock therebetween and to carry said shock downwardly and rearwardly to deposit the shock upon the ground, said last named means including provision for freeing the walls from the deposited shock and returning said walls to normal position.

16. A shocking machine equipped with shock forming and depositing means including opposing walls between which the shock is formed, means for operating said walls to carry the formed shock downwardly and rearwardly in the lower arc of a circle, means for moving the upper edges of said walls inwardly against the heads of the sheaves composing the shock as the latter is carried to the ground between said walls and means for retracting the upper edges of the walls to free the shock as the latter is deposited upon the ground.

17. A shocking machine equipped with shock forming and depositing mechanism including a shock support, guide walls between which the shock is formed on said support and operating mechanism functioning on completion of the shock to move the support downwardly and forwardly in a curved path approximately the lower arc of a circle and to simultaneously move said guide walls with the interposed shock downwardly and rearwardly in a curved path also approximately the lower arc of a circle.

18. A shocking machine equipped with shock forming and depositing means including opposing walls between which the shock is formed, means for operating said walls to carry the formed shock along a downwardly and rearwardly curving path so as to deposit the shock upon the ground, shock engaging members carried by the walls and functioning during the aforesaid operation to prevent relative slippage between the walls and shock and means for rendering said members inoperative upon depositing of the shock.

19. A shocking machine equipped with a shock former including laterally movable walls equipped with means for causing same to approach or recede from one another as the height and thickness of the sheaves interposed therebetween varies, a displaceable support, means for forming the shock on said support and between said walls and means functional on completion of the shock to carry said walls, together with the interposed shock, in a downwardly and rearwardly curving path so as to deposit the shock upon the ground without imparting forward momentum thereto.

20. A shocking machine equipped with a shock former including laterally movable spring pressed walls arranged to approach or recede from one another as the height and thickness of the sheaves interposed therebetween varies, and means functional on completion of a shock between said walls to carry the walls, together with the interposed sheaves, downwardly and rearwardly to the ground, said means including provision for freeing the walls from the shock upon deposit of the latter.

21. A shocking machine equipped with a shock former including hingedly mounted walls between which the shock is built, said walls being movable inwardly or outwardly to conform to sheaves of varying height and thickness, rotatably mounted cranks supporting said walls and means for causing said cranks to perform a complete revolution whereby said walls, together with the interposed shock, are moved in a downwardly and rearwardly curving path to deposit the shock upon the ground, subsequent to which the walls are returned to normal position by the continued rotation of said cranks and means functioning to disengage the walls with the shock subsequent to depositing of the shock upon the ground.

22. A shocking machine equipped with a shock former including hingedly mounted spring pressed walls arranged to swing inwardly or outwardly automatically to adjust themselves in accordance with variations in the height and thickness of the interposed sheaves, rotatable cranks supporting said walls, means for periodically moving said cranks through a complete revolution to carry said walls downwardly and rearwardly toward the ground and then upwardly and forwardly to normal position and means for causing said walls to grip and carry the interposed sheaves therewith during movement of said walls downwardly and rearwardly toward the ground.

23. A shocking machine equipped with a shock former including hingedly mounted walls between which the shock is formed, spring devices associated with said walls and serving to exert inward pressure thereon when the walls are in shock forming position, and means functioning on completion of the shock to carry said walls downwardly and rearwardly to shock depositing position and then upwardly and forwardly to normal shock forming position, said spring devices functioning during the downward and rearward movement of said walls to swing the latter inwardly to grasp and carry the interposed shock therewith, said spring devices subsequently functioning on deposit of the shock to swing said walls outwardly to shock releasing position.

24. A shocking machine equipped with a partition, means for positioning sheaves in shock formation at opposite sides of said partition, and means for displacing said partition to an inoperative position upon completion of the shock.

25. A shocking machine equipped with a partition, means for positioning a row of sheaves against each side of the partition to form a shock, and means for moving the partition upwardly from between the two rows of sheaves upon completion of the shock.

26. A shocking machine equipped with an expansible and collapsible partition, means for positioning a row of sheaves against each side of the partition to form a shock and means for collapsing said partition upon completion of the shock.

27. A shocking machine equipped with an expansible and collapsible partition, means for positioning sheaves in shock formation at opposite sides of said partition in the expanded position of the latter, and means for collapsing and lifting said partition upon completion of the shock.

28. A shocking machine equipped with a partition, means for positioning sheaves in shock formation at opposite sides of said partition, control arms carried by said partition, and means for periodically moving said partition to and from operative position.

29. A shocking machine equipped with a partition, means for positioning sheaves in shock formation at opposite sides of said partition, pivotally mounted sheaf engaging control arms carried by said partition, means for periodically raising and lowering said partition and means for simultaneously swinging said control arms to and from operative position.

30. A shocking machine equipped with an expansible and contractable partition, control arms pivoted to said partition to engage sheaves arranged in shock formation at opposite sides of the partition, means for periodically raising and lowering said partition, means functioning to collapse and expand the partition as the latter is raised and lowered, and means functioning to swing said control arms to and from sheaf engaging positions coincidentally with the lowering and raising of the partition.

31. A shocking machine equipped with a partition, shock carriers upon which the sheaves are arranged in shock formation at opposite sides of said partition, means for moving said shock carriers downwardly and forwardly upon completion of a shock thereon, and means for simultaneously raising said partition.

32. A shocking machine equipped with a collapsible and expansible partition, shock carriers upon which the sheaves are arranged in shock form at opposite sides of the partition, means for moving said shock carriers downwardly and forwardly upon completion of a shock thereon and means for simultaneously collapsing and raising said partition.

33. A shocking machine equipped with a partition, movable sheaf engaging control arms carried thereby, shock carriers upon which the sheaves are arranged in shock formation at opposite sides of said partition, means for moving said shock carriers downwardly and forwardly upon completion of a shock thereon, means for simultaneously raising said partition, and means for actuating said control arms to an inoperative position coincident with the raising of said partition.

34. A shocking machine equipped with a partition, shock carriers for supporting sheaves in shock formation at opposite sides of said partition, means for periodically moving said shock carriers to and from an operative position, and means for simultaneously lowering and raising said partition.

35. A shocking machine equipped with a partition, shock carriers for supporting sheaves in shock formation at opposite sides of said partition, sheaf engaging control arms arranged to engage the sheaves as the latter are positioned at opposite sides of the partition, means for periodically moving said shock carriers to and from operative position, means for simultaneously lowering and raising said partition, and means for actuating said control arms to and from operative position coincident with the lowering and raising of said partition.

36. A shocking machine equipped with a partition, retaining walls arranged at opposite sides of said partition, shock carrier means normally underlying said partition, means for positioning sheaves on said shock carrier means between each retaining wall and the adjacent side of the partition, and means functional on completion of the shock to withdraw the shock carrier means downwardly and forwardly from beneath the shock and simultaneously functioning means serving to carry the retaining walls, together with the interposed shock, toward the ground in a downwardly and rearwardly curving path so as to deposit the shock on the ground without imparting forward momentum thereto.

37. A shocking machine equipped with a partition, retaining walls arranged at opposite sides of said partition, shock supporting means underlying said partition, means for arranging sheaves on said shock supporting means between each retaining wall and the adjacent side of the partition, means functional on completion of the shock to displace the supporting means and the partition from operative position and simultaneously functioning means operating to carry the formed shock downwardly to the ground.

38. A shocking machine equipped with a partition, retaining walls arranged at opposite sides of said partition, shock carrying means underlying said partition, means for positioning the sheaves on the shock carrying means between each retaining wall and the adjacent side of the partition, means functional on completion of the shock to displace the shock carrying means, rotatably mounted cranks supporting said retaining walls and means including said cranks for simultaneously operating the retaining walls to carry the formed shock downwardly to the ground.

39. A shocking machine equipped with a partition, retaining walls arranged at opposite sides of said partition, shock carrying means normally underlying said partition, means for positioning sheaves on said shock carrying means between each retaining wall and the adjacent side of the partition, means functional on completion of the shock to displace the shock carrying means and the partition to inoperative position and means for simultaneously operating the retaining walls to deposit the shock upon the ground.

40. A shocking machine equipped with a partition, retaining walls arranged at opposite sides of said partition, shock carrying means normally underlying said partition, means for positioning sheaves on said shock carrying means between each retaining wall and the adjacent side of the partition, means functional on completion of the shock to displace both the shock carrying means and the partition from operative positions to thereby facilitate deposit of the completed shock, and means for simultaneously operating said retaining walls to carry the formed shock downwardly and rearwardly in a path substantially approximating the lower arc of a circle.

41. A shocking machine equipped with a partition, retaining walls arranged at opposite sides of said partition, shock carriers underlying said partition, means for positioning sheaves on said shock carriers between each retaining wall and the adjacent side of the partition, means functional on completion of the shock to raise the partition and to move the shock carriers downwardly and forwardly from beneath the formed shock and means for simultaneously operating the retaining walls to carry the formed shock downwardly and rearwardly to thereby deposit the shock upon the ground.

42. A shocking machine equipped with a vertically movable collapsible and expansible partition normally expanded and occupying a lowered position, retaining walls arranged at opposite sides of said partition, shock carriers underlying said partition, means for arranging sheaves on said shock carriers between each retaining wall and the adjacent side of the partition, means for moving the shock carriers downwardly and forwardly upon completion of the shock, means for collapsing and raising said partition concurrently with the downward and forward movement of the shock carriers and simultaneously functioning means for operating the retaining walls to carry the interposed shock downwardly and rearwardly.

43. A shocking machine equipped with a vertically movable collapsible and expansible partition, said partition being normally expanded and supported in its lowermost position, movable sheaf engaging control arms carried by said partition, retaining walls arranged at opposite sides of said partition, shock carriers underlying said partition, means for placing sheaves on the shock carriers between each retaining wall and the adjacent side of the partition, means functional on completion of the shock to move the shock carriers downwardly and forwardly and to collapse and raise the partition, means for displacing said control arms coincident with the raising of said partition and simultaneously functioning means for operating the retaining walls to carry the formed shock downwardly and rearwardly.

44. A shocking machine equipped with an expansible and collapsible partition, means for periodically raising and lowering said partition, means for collapsing and expanding said partition as the latter is raised and lowered, movable sheaf engaging control arms carried by said partition, means for shifting said control arms to and from operative position concurrently with the lowering and raising of said partition, shock carriers underlying said partition, means for periodically shifting said shock carriers to and from a sheaf carrying position, retaining walls normally arranged in shock forming position at opposite sides of said partition, and means for periodically operating said walls to effect deposit of the formed shock and to subsequently return said walls to normal shock forming position.

45. A shocking machine equipped with a partition, retaining walls arranged at opposite sides of said partition, shock carriers underlying said partition, means for placing sheaves on the shock carriers between each retaining wall and the adjacent side of the partition, a collapsible and expansible shock spreader arranged to engage and spread the sheaves so placed, means functional on completion of the shock to move the shock carriers downwardly and forwardly, said means including provision for collapsing the shock spreader and causing the latter to move downwardly and forwardly with the shock carriers, means for raising the partition concurrently with the downward and forward movement of the shock carriers and the shock spreader and simultaneously functioning means for operating the retaining walls to carry the formed shock downwardly and rearwardly.

46. A shocking machine equipped with a sheaf receiving pan, and means for moving said pan in a circular path about a horizontal axis whereby the sheaf carried by the pan is upended and discharged therefrom as the pan travels upwardly in a lower arc of the circular path through which the pan is moved.

47. A shocking machine equipped with a sheaf receiving pan rotatable about a horizontal axis and a sheaf pusher arranged in fixed trailing relation to said pan and movable therewith.

48. A shocking machine equipped with a sheaf receiving pan rotatable about a horizontal axis, a sheaf pusher arranged in fixed trailing relation to said pan and movable therewith, and a movable support situated below said sheaf receiving pan and sheaf pusher to cooperate therewith in upending a sheaf delivered to the pan.

49. A shocking machine equipped with a plurality of alternately arranged sheaf receiving pans and sheaf pushers, means for periodically causing said pans and pushers to travel in a circular path about a horizontal axis and a movable sheaf butt support underlying said pans and pushers to cooperate therewith in upending a sheaf delivered to one of said pans.

50. A shocking machine equipped with a partition, retaining walls arranged at opposite sides of said partition, shock carriers underlying said partition, a periodically operable reversely rotatable sheaf placer functioning to place the sheaves delivered thereto upon said sheaf carriers and at opposite sides of said partition, means for delivering sheaves to said sheaf placer comprising alternately arranged sheaf receiving pans and sheaf pushers periodically rotatable about a horizontal axis, and a movable sheaf butt supporting element underlying said pans and pushers.

51. A shocking machine equipped with shock forming and depositing means, a sheaf counting mechanism operable with each delivery of a sheaf to the shock forming and depositing means, trip mechanism actuatable by said sheaf counting mechanism for effecting deposit of the formed shock when the desired number of sheaves, predetermined by initial setting of the counting mechanism, have been delivered to the shock forming and depositing means, and means for varying the initial setting of the counting mechanism to vary the number of sheaves delivered to the shock forming and depositing means prior to actuation of said trip mechanism.

52. A shocking machine equipped with shock forming and depositing means, means for delivering sheaves to said shock forming and depositing means including a sheaf counting mechanism operable with each delivery of a sheaf to said shock forming and depositing means, means for operating the shock forming and depositing means to deposit the formed shock, said means including a trip mechanism actuatable by the sheaf counting mechanism subsequent to the delivery to the shock forming and depositing mechanism of a number of sheaves predetermined by the initial setting of the sheaf counting mechanism, and means for varying the initial setting of the sheaf counting mechanism to vary the number of sheaves delivered to the shock forming and depositing means prior to the actuation of the trip mechanism, and means for resetting the counting mechanism after each shock depositing operation.

53. A shocking machine equipped with shock forming and depositing means expansible and contractable when in sheaf receiving position to conform to variations in the height and thickness of the grain, means for operating the shock forming and depositing means to deposit the formed shock, and means for delivering sheaves to the shock forming and depositing mechanism including a sheaf counter operable with each delivery of a sheaf to the shock forming and depositing means and means for changing the initial setting of the sheaf counter to vary the number of sheaves delivered to the shock forming and depositing means prior to the shock depositing operation whereby the size of the formed shocks may be varied at the will of the operator through the instrumentality of the sheaf counter.

54. In a shocking machine equipped with its own source of power, the combination of a shock forming and setting mechanism, a sheaf placing mechanism functioning to deliver sheaves to the shock forming and setting mechanism, a conveyor mechanism functioning to receive sheaves from a binder and to deliver said sheaves to the shock placing mechanism, means for establishing a drive connection between the source of power and the conveyor mechanism upon delivery of a sheaf to the latter, means controlled by the conveyor mechanism for establishing a drive connection between the source of power and the sheaf placing mechanism each time a sheaf is delivered to said sheaf placing mechanism and means controlled by the sheaf placing mechanism for establishing a drive connection between said source of power and the shock forming and setting mechanism when a predetermined number of sheaves have been delivered to said shock forming and setting mechanism.

55. In a shocking machine of the character set forth in claim 54 the provision of means for automatically disrupting the said drive connections after each complete operation of the mechanism operated thereby.

56. In a shocking machine having its own source of power, the combination of shock forming and depositing means, a sheaf placer functioning to deliver sheaves to said shock forming and depositing means, a sheaf counting mechanism adapted to operate in unison with the sheaf placer, a conveyor mechanism functioning to receive sheaves from a binder and to deliver said sheaves to the sheaf placer, means for establishing a drive connection between said source of power and the conveyor mechanism coincident with the delivery of a sheaf to said conveyor mechanism, means controlled by the conveyor mechanism for establishing a drive connection between said source of power and the sheaf placer coincident with the delivery of a sheaf to said placer and means directly controlled by the sheaf counting mechanism for establishing a drive connection between the said source of power and the shock forming and depositing mechanism when a predetermined number of sheaves have been delivered to said shock forming and depositing mechanism by the sheaf placer.

57. The combination with a binder of a shocking machine having its own source of power, said shocking machine including shock forming and depositing means, a sheaf placer for delivering sheaves to said shock forming and depositing means, a sheaf counter operating in unison with the sheaf placer, a conveyor mechanism functioning to receive sheaves from the binder and to deliver said sheaves to the sheaf placer, means controlled by the sheaf delivery mechanism of the binder to automatically establish a drive connection between the said source of power and the conveying mechanism upon delivery of a sheaf to said conveying mechanism, means controlled by the operation of the conveyor mechanism for establishing a drive connection between said source of power, the sheaf placer and the sheaf counting mechanism each time a sheaf is delivered to the sheaf placer, means controlled by the operation of the sheaf counting mechanism for establishing an operating connection between said source of power and the shock forming and depositing means when a predetermined number of sheaves have been delivered to the latter means by the sheaf placer and means for automatically disrupting each drive connection subsequent to a complete operation of the means actuated thereby.

In witness whereof we have hereunto set our hands.

NICHOLAS PAUL BOYCHUK.
JOHN PAUL BOYCHUK.